United States Patent
Davidian et al.

(10) Patent No.: US 10,196,940 B2
(45) Date of Patent: Feb. 5, 2019

(54) METHOD AND APPARATUS FOR GENERATING ELECTRICITY AND STORING ENERGY USING A THERMAL OR NUCLEAR POWER PLANT

(71) Applicant: L'Air Liquide, Societe Anonyme pour l'Etude et l'Exploitation des Procedes Georges Claude, Paris (FR)

(72) Inventors: Benoit Davidian, Saint Maur des Fosses (FR); Cyrille Paufique, Lyons (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 181 days.

(21) Appl. No.: 15/105,254

(22) PCT Filed: Dec. 17, 2014

(86) PCT No.: PCT/FR2014/053390
§ 371 (c)(1),
(2) Date: Jun. 16, 2016

(87) PCT Pub. No.: WO2015/092275
PCT Pub. Date: Jun. 25, 2015

(65) Prior Publication Data
US 2016/0363007 A1    Dec. 15, 2016

(30) Foreign Application Priority Data

Dec. 20, 2013  (FR) ..................................... 13 63248

(51) Int. Cl.
*F01K 13/00* (2006.01)
*F01K 7/22* (2006.01)
(Continued)

(52) U.S. Cl.
CPC .............. *F01K 13/00* (2013.01); *F01D 13/00* (2013.01); *F01D 15/10* (2013.01); *F01K 3/18* (2013.01);
(Continued)

(58) Field of Classification Search
CPC .......... F01D 13/00; F01D 15/10; F01K 11/02; F01K 13/00; F01K 15/00; F01K 23/02;
(Continued)

(56) References Cited

U.S. PATENT DOCUMENTS

| 3,943,719 A | 3/1976 | Terry et al. |
| 4,329,842 A | 5/1982 | Hoskinson |

(Continued)

FOREIGN PATENT DOCUMENTS

| JP | 56047625 A | * 4/1981 | ............. F01K 23/10 |
| JP | S56 47625 |  4/1981 | |

(Continued)

OTHER PUBLICATIONS

International Search Report and Written Opinion for PCT/FR2014/053390, dated Apr. 8, 2015.

(Continued)

*Primary Examiner* — Phutthiwat Wongwian
*Assistant Examiner* — Matthew T Largi
(74) *Attorney, Agent, or Firm* — Justin K. Murray

(57) ABSTRACT

A method for generating electricity by means of a nuclear power plant and a liquid vaporization apparatus involves, during a first period, producing heat energy by means of the nuclear power plant and using the heat energy to vaporize water or to heat water vapor, expanding the water vapor formed in a first turbine and using the first turbine to drive an electricity generator in order to produce electricity, vaporizing liquefied gas coming from a cryogenic store in order to produce pressurized gas, reheating the pressurized gas with (Continued)

a part of the water vapor intended for the first turbine of the nuclear power plant and expanding the pressurized fluid in a second turbine to produce electricity and, during the second period, liquefying the gas to be vaporized.

18 Claims, 1 Drawing Sheet

(51) Int. Cl.
```
F01K 7/38      (2006.01)
F01K 3/18      (2006.01)
F01K 23/02     (2006.01)
G21D 1/02      (2006.01)
H02K 7/18      (2006.01)
F01K 23/08     (2006.01)
F01D 13/00     (2006.01)
F01D 15/10     (2006.01)
F01K 7/16      (2006.01)
F01K 11/02     (2006.01)
F01K 15/00     (2006.01)
```
(52) U.S. Cl.
CPC ............... *F01K 3/181* (2013.01); *F01K 7/16* (2013.01); *F01K 7/22* (2013.01); *F01K 7/38* (2013.01); *F01K 11/02* (2013.01); *F01K 15/00* (2013.01); *F01K 23/02* (2013.01); *F01K 23/08* (2013.01); *G21D 1/02* (2013.01); *H02K 7/1823* (2013.01); *Y02E 20/16* (2013.01)

(58) Field of Classification Search
CPC . F01K 23/08; F01K 3/18; F01K 3/181; F01K 7/16; F01K 7/22; F01K 7/38; G21D 1/02; H02K 7/1823
See application file for complete search history.

(56) References Cited

U.S. PATENT DOCUMENTS

| | | | | |
|---|---|---|---|---|
| 5,060,480 A | * | 10/1991 | Saulnier | ................ F25J 1/0017 |
| | | | | 62/50.2 |
| 6,622,470 B2 | * | 9/2003 | Viteri | .................... F01K 21/047 |
| | | | | 60/39.52 |
| 7,028,481 B1 | | 4/2006 | Marrow | |
| 2008/0216510 A1 | * | 9/2008 | Vandor | .................... F02C 6/16 |
| | | | | 62/600 |
| 2009/0100845 A1 | | 4/2009 | Amir et al. | |
| 2009/0282840 A1 | * | 11/2009 | Chen | .................... F01D 15/005 |
| | | | | 62/50.3 |
| 2011/0132032 A1 | * | 6/2011 | Gatti | ........................ F02C 6/10 |
| | | | | 62/615 |
| 2012/0151961 A1 | | 6/2012 | Ha et al. | |
| 2012/0216520 A1 | * | 8/2012 | Chen | ........................ F03G 7/06 |
| | | | | 60/412 |

FOREIGN PATENT DOCUMENTS

| | | |
|---|---|---|
| JP | S59 180 012 | 10/1984 |
| JP | H04-112634 | 4/1992 |
| JP | 2000-120404 | 4/2000 |

OTHER PUBLICATIONS

Dubetier, et al., "Cryogenic Solutions for Energy Storage and the Optimization of Energy Supply," Revue Generale du Froid, pp. 1-10.

\* cited by examiner

METHOD AND APPARATUS FOR GENERATING ELECTRICITY AND STORING ENERGY USING A THERMAL OR NUCLEAR POWER PLANT

CROSS REFERENCE TO RELATED APPLICATIONS

This application is a § 371 of International PCT Application PCT/FR2014/053390, filed Dec. 17, 2014, which claims the benefit of FR1363248, filed Dec. 20, 2013, both of which are herein incorporated by reference in their entireties.

TECHNICAL FIELD OF THE INVENTION

The present invention relates to a method and apparatus for the generation of electricity using a thermal or nuclear power plant which permits the storage of energy by the liquefaction of gas. The invention also relates to apparatus for the implementation of such methods.

A first object of the invention is the generation of electricity with improved efficiency.

A second object of the invention is the reduction of storage costs for energy generated by an electricity generation method using a power plant and incorporating an electrical energy storage facility using liquefied gas.

BACKGROUND OF THE INVENTION

Many nuclear power plants are pressurized water reactors.

These nuclear power plants comprise at least two mutually independent water circuits: the primary circuit and the secondary circuit.

The function of the primary circuit is the capture of heat from the nuclear reaction. Heat is produced in very large quantities by the fission of uranium atoms.

Placed within the reactor vessel, water in the primary circuit thus achieves a temperature of approximately 320°, after having been heated during the chain reaction.

This water does not boil, as it is very highly pressurized. It is then routed from the reactor core to the primary circuit, which is a closed circuit.

The water in the primary circuit heats the water in the secondary circuit via a steam generator, which permits the exchange of heat between the two independent circuits. The pipes in the primary circuit heat the water in the secondary circuit by contact to form water vapor.

The water in the secondary circuit is at a lower pressure, and is therefore converted into steam. This steam drives the reactor turbine. The rotation of the turbine in turn drives the generator, thus permitting the production of electricity.

Other nuclear power plants have a primary circuit only, and the water which is heated by the nuclear reaction is vaporized to form water vapor.

US-A-2012151961 describes a method for the storage of liquefied air. During phases of low electricity demand, air is liquefied and stored. During phases of high electricity demand, liquid air is vaporized in a system which optimizes the recovery of cold, to generate a pressurized fluid which drives a turbine for the production of electricity. The energy obtained (and consequently the efficiency of storage) is all the more efficient if the fluid is heated using residual heat prior to expansion.

The article "Cryogenic Solutions for Energy Storage and the Optimization of Energy Supply" in the *Revue Générale du Froid*, by Dubettier et al, describes the heating of vaporized air using residual heat, or by means of natural gas burners to increase the energy produced by the expansion of air.

The solution described in the prior art is as follows:
during phases of low demand:
  Electrical energy is used to produce liquid air
  A proportion of the available thermal energy is stored for use at times of high demand, and will be used to heat up pressurized gas prior to expansion
and during phases of high demand:
  Liquefied gas is vaporized, with the recovery of cold, to produce a pressurized gas
  The pressurized gas is heated using previously stored thermal energy
  The gas is expanded to produce electricity

SUMMARY OF THE INVENTION

In a thermal power plant, hot gases generated by the combustion of fuel (coal, natural gas, oil, etc.) heat the water or water vapor to form water vapor which is to be fed to a steam turbine, which generates electricity. The same applies in a combined cycle where the combustion gases which expand in the gas turbine, and are still hot, are used to heat the water or water vapor to form water vapor which is to be fed a steam turbine, which generates electricity.

It is surprising to observe that the generation of electricity is more efficient where a proportion of the heat generated by the power plant is used, not in the steam turbine of the power plant, but for the preheating of a gas which is to be fed to a turbine.

Rather than storing thermal energy during phases of low demand, it is proposed that a proportion of the thermal energy produced by the power plant during phases of high demand should be tapped: this reduces electricity production by the thermal power plant, but permits a substantial increase in the electrical energy produced by the pressurized fluid, which has been heated by the thermal energy thus tapped.

Although the energy efficiency performance is slightly impaired in this case, investment in a very large-scale and highly expensive thermal energy storage facility can be obviated.

One object of the invention is the reduction of the cost of an electricity generating apparatus by eliminating the requirement for storage facilities.

According to certain embodiments of the invention, primary (rather than residual) thermal energy is used, which is normally employed for the generation of electricity in the power plant, at the time, moreover, where electricity is to be supplied to the grid system. The superior efficiency of the vaporized air (or atmospheric gas) cycle, in comparison with the steam cycle of the steam turbine of the power plant, is exploited to deliver more energy to the grid system.

During periods of low electricity consumption, it is sometimes necessary to store thermal energy generated by the power plant. Thermal energy storage facilities required for this purpose are voluminous, expensive and relatively difficult to implement.

In one embodiment, the invention proposes the elimination or reduction in size of these storage facilities, and the replacement thereof, at least partially, by a system for the liquefaction of air or of atmospheric gas.

According to one object of the invention, a method is proposed for the generation of electricity and the storage of energy by means of a thermal power plant or a nuclear power plant, and a liquid vaporization apparatus, wherein A) during a first period:
 a) i) thermal energy is produced by means of the thermal power plant, gases are produced, at least a proportion of the gases is used to vaporize water or to heat water vapor, the water vapor formed is expanded in a first turbine, and the first turbine is used to drive an electricity generator for the production of electricity
 or
  ii) thermal energy is produced by means of the nuclear power plant, and the thermal energy is used to vaporize water or to heat water vapor, the water vapor formed is expanded in a first turbine, and the first turbine is used to drive an electricity generator for the production of electricity
 b) liquefied gas sourced from a cryogenic storage facility is vaporized to produce a pressurized gas
 c) the pressurized gas is heated, and
 d) the pressurized fluid is expanded in a second turbine for the production of electricity
 e) to heat the pressurized fluid, a proportion of the thermal energy produced in step a) is used for the heating of the pressurized fluid, by employing a proportion of the gases from the thermal power plant or a proportion of the water vapor to be delivered to the first turbine of the thermal or nuclear power plant, or a proportion of the heat of the water vapor to be delivered to the first turbine of the thermal or nuclear power plant for the heating of the pressurized fluid, and B) during a second period
 a') thermal energy is produced by means of the thermal or nuclear power plant, and the thermal energy is used to generate electricity,
 b') electrical and/or mechanical energy generated by the power plant is used to liquefy the gas, and
 c') the liquefied gas is stored in a storage facility (S).

According to further optional aspects:
thermal energy is produced by means of a nuclear power plant, a fluid is heated by the heat generated by a nuclear reaction, a proportion of the heat energy of the heated fluid is used to preheat the fluid to be delivered to the second turbine, and a further proportion of the heat energy of the heated fluid is used to heat the water or water vapor delivered to a first turbine, where its expansion generates electricity.

a first proportion of the fluid heated by the nuclear reaction heats the water or water vapor to be delivered to the first turbine, and a second proportion of the fluid heated by the nuclear reaction heats the pressurized gas to be delivered to the second turbine, whereby the flow rate of the second proportion of the fluid is no more than 30% of the sum of the first and second proportions.

a first proportion of the water vapor generated by the nuclear reaction expands in the first turbine, and a second proportion of the water vapor generated by the nuclear reaction is used to preheat the pressurized gas to be delivered to the second turbine, whereby the flow rate of the second proportion of the water vapor is no more than 30% of the sum of the first and second proportions.

thermal energy is produced by means of a thermal power plant, gases are produced by the combustion of a fuel, a proportion of the heat of the gases is used to preheat the fluid to be delivered to the second turbine, and a further proportion of the heat of the gases is used to heat the water or water vapor delivered to a first turbine, where its expansion generates electricity.

a first proportion of the gases is used to heat the steam delivered to the first turbine for expansion, and a second proportion of the gases preheats the pressurized gas, whereby the flow rate of the second proportion of the gases is no more than 30% of the sum of the first and second proportions.

the gases firstly heat the pressurized gas, and are then used to heat the steam which is delivered to the first turbine, where it expands.

the first and second turbines in combination produce more electricity than would have been produced by the first turbine alone, using all the heat energy of the heated fluid or the gases respectively to heat the water or water vapor to be delivered to the first turbine.

the electricity generated by the first and/or second turbine is transmitted to the grid system.

the only gas which expands in the second turbine is the pressurized fluid.

during the first period, the gas is not liquefied.

the second period corresponds to a period of lower electricity demand and/or a period in which the electricity tariff is lower than in the first period.

during the second period, the first turbine generates electricity, which is used to liquefy the gas.

during the first period, the gas is not liquefied.

during the first period, the stored liquid is not vaporized and/or the pressurized fluid is not expanded in the second turbine.

According to a further object of the invention, an integrated electricity generating apparatus is provided, comprising a nuclear or thermal power plant with a first turbine, which is a steam turbine, connected to means for the generation of electricity, an apparatus for the liquefaction of a gas and the vaporization of the liquefied gas with a second turbine, which is a turbine for the expansion of vaporized liquefied gas, connected to means for the generation of electricity, means for the transference of electrical or mechanical energy from the power plant to the liquefaction apparatus, and means for the preheating of the vaporized liquefied gas up-circuit of the expansion turbine, characterized in that it comprises means for the transmission i) of the gases or water vapor, originating from the thermal power plant, or
ii) of the water vapor generated and/or heated by the nuclear reaction, and originating from the nuclear power plant, or
iii) of a fluid heated by the nuclear reaction, originating from the nuclear power plant, to the means for the preheating of the vaporized liquefied gas, in that the liquefaction apparatus is connected to the power plant for the supply thereto of electrical and/or mechanical energy generated by the power plant, and in that it comprises a storage facility for the storage of liquefied gas.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
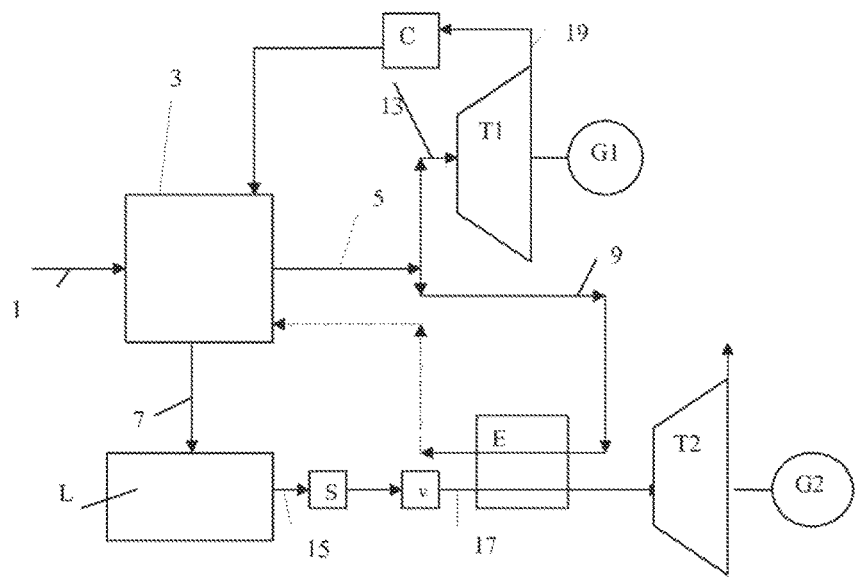
FIG. 1 represents a process flow diagram in accordance with an embodiment of the present invention.
Figure 2:
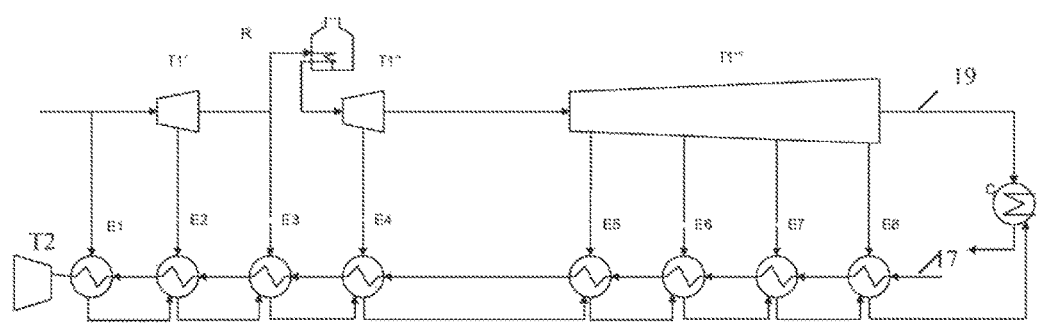
FIG. 2 represents a process flow diagram in accordance with an embodiment of the present invention.

The invention will be described in greater detail with reference to the figures, which illustrate a method according to the invention. FIG. 1 shows a schematic and partial representation of a method according to the invention, and FIG. 2 shows the details of one variant of a method according to the invention.

In FIG. 1, for the implementation of a method for the generation of electricity, a power plant 3 is used, which may be a thermal power plant or a nuclear power plant, together with a liquid vaporization apparatus V.

Thermal energy is produced by means of the power plant 3, which may be supplied with a fuel 1, for example of coal or natural gas in the case of a thermal power plant. In the case of a thermal power plant, the latter produces gases, at least a proportion of which is used for the vaporization of water or the heating of water vapor. Accordingly, the thermal power plant produces water vapor 5.

The power plant 3 may also be a nuclear power plant, in which the nuclear reaction heats and vaporizes water, whether directly or indirectly, to produce water vapor 5.

A proportion 13 of the water vapor 5, comprising at least 70% of the flow rate 5, is expanded in a first turbine T1, whereby the expanded steam 19 is then generally condensed in a condenser C, then returned to the power plant 3, and the first turbine is used to drive an electricity generator G1 for the production of electricity.

The remaining water vapor 9, comprising no more than 30% of the flow rate 5, is used to heat a vaporized cryogenic liquid 17, which may be for example air or nitrogen. The vaporized liquid 17 is heated by the water vapor in the heat-exchanger E to a temperature which exceeds the ambient temperature, and delivered to the second turbine T2. The second turbine is used to drive an electricity generator G2. If the expansion of the vaporized liquid 17 proceeds in a number of steps, the vaporized liquid 17 may be heated in advance of each step.

This represents the simplest form of embodiment of the invention. In this case, the air or nitrogen expanded in the second turbine T2 may be discharged to the atmosphere. The water vapor 9 which has heated the gas 17 in the heat-exchanger E may be returned to the power plant 3, where applicable after condensation in a condenser, which may be the same as that used down-circuit of the turbine T1 (the condenser C), or discharged to the atmosphere.

The quantity of electricity produced by the two generators G1, G2 exceeds that which would be produced if all the steam 5 were delivered to the first turbine T1, and only generator G1 were in service.

The integrated method employs mechanical or electrical energy 7 originating from the power plant 3 for the operation of an apparatus L for the liquefaction of an atmospheric gas, for example air or nitrogen. The liquefied gas is stored in a storage facility S, and the stored liquid is tapped for vaporization in the vaporizer V, in order to supply the gas to be expanded in the second turbine T2.

The liquefied gas may be a gas other than an atmospheric gas, for example natural gas or carbon dioxide.

Preferably, during a first period, the liquefaction apparatus L is not in service, and the stored liquid is vaporized, heated by the steam 9 and delivered to the second turbine T2. This period corresponds to a period of higher electricity demand and/or a period in which the electricity tariff is higher. Only a proportion 13 of the steam is delivered to the first turbine T1. The proportion 13 constitutes at least 70% of the flow rate 5.

During a second period, which is a period of lower electricity demand and/or a period in which the electricity tariff is lower than in the first period, the full amount of steam 5 is delivered to the first turbine T1, constituting the flow rate 13, the liquefaction apparatus receives energy 7 for the liquefaction of gas and stores the liquefied gas. The vaporizer V and the turbine T2 are not in service. No proportion of the steam is delivered to the heat-exchanger E.

A further possibility, if the power plant 3 is a thermal power plant, would be the employment of a proportion of the gases to heat the gas 17 in the heat-exchanger E, and of the remainder of the gases to heat the water vapor or water, in order to generate steam for delivery to the first turbine T1. The proportion of the gases delivered to the heat-exchanger E will be limited to no more than 30% of the total flow rate, in order to permit the continuing operation of the turbine T1.

Rather than dividing the water vapor 5 in two for the supply of the turbine T1 and the heat-exchanger E, another possibility would be to feed the water vapor 5 into the heat-exchanger E first, prior to the expansion of the water vapor in the first turbine T1.

Likewise in a thermal power plant, the gases might firstly be fed to the heat-exchanger E for the heating of the gas 17, then used to heat the water vapor to be delivered to the first turbine T1.

The water vapor 9 for the heating of the heat-exchanger E may originate from an inter-stage in the first turbine T1.

As illustrated in FIG. 2, a number of streams of water vapor at different temperatures may be used to heat the vaporized liquid 17 at different stages.

In order to improve heat exchange efficiency, the turbine T1 in FIG. 1 is comprised of a high-pressure turbine T1', an intermediate-pressure turbine T1" and a low-pressure turbine T1'''. The water vapor 13 is expanded in these three turbines in series, and the steam is tapped at eight different pressure levels. Each of these streams of steam heats the vaporized liquid 17 in a heat-exchanger E1, E2, E3, E4, E5, E6, E7, E8 to produce the heated stream delivered to the turbine T2. The heat-exchangers E1, E2, E3, E4, E5, E6, E7, E8 fulfil the role of E in FIG. 1. Likewise, the turbine T2 may be comprised of a number of expansion stages, with reheating prior to each expansion, in accordance with the principle described above. The streams of steam are combined again and delivered to the condenser C, where the steam 19 discharged from the final turbine T1''' is condensed. As illustrated in FIG. 1, the steam condensed in the condenser C may be transmitted to the power plant 3.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for the generation of electricity and the storage of energy by means of a thermal power plant or a nuclear power plant, and a liquid vaporization apparatus, wherein the method comprises the steps of:
   A) during a first period:
      a) producing thermal energy by a power plant selected from the group consisting of the thermal power plant and the nuclear power plant, wherein the produced thermal energy is used to vaporize water or to heat water vapor, which is then expanded in a first turbine, and the first turbine is used to drive an electricity generator for the production of electricity;
      b) vaporizing a cryogenic liquid sourced from a cryogenic storage facility to produce a pressurized gas;
      c) heating the pressurized gas to form a heated pressurized fluid; and
      d) expanding the heated pressurized fluid in a second turbine for the production of electricity,
      wherein a proportion of the thermal energy produced in step a) is used for the heating in step c), by employing a proportion of the water vapor to be delivered to the first turbine of the nuclear power plant, or a proportion of the heat of the water vapor to be delivered to the first turbine of the nuclear power plant for the heating of the pressurized gas,
      wherein the thermal energy is produced by means of a nuclear power plant, a fluid is heated by the heat generated by a nuclear reaction to form a heated fluid, a first proportion of the heat energy of the heated fluid is used to heat the pressurized gas in step c), and a second proportion of the heat energy of the heated fluid is used to heat the water or water vapor delivered to the first turbine in step a);
   B) during a second period:
      a') producing thermal energy by means of the thermal or nuclear power plant, and using the thermal energy to generate electricity;
      b') using electrical and/or mechanical energy generated by the power plant to produce the cryogenic liquid; and
      c') storing the cryogenic liquid in the cryogenic storage facility.

2. The method as claimed in claim 1, wherein a first proportion of the heated fluid heats the water or water vapor to be delivered to the first turbine, and a second proportion of the heated fluid heats the pressurized gas to be delivered to the second turbine, whereby the flow rate of the second proportion of the heated fluid is no more than 30% of the sum of the first and second proportions.

3. The method as claimed in claim 1, wherein a first proportion of the water vapor generated by the nuclear reaction expands in the first turbine and a second proportion of the water vapor generated by the nuclear reaction is used to heat the pressurized gas to be delivered to the second turbine, whereby the flow rate of the second proportion of the water vapor is no more than 30% of the sum of the first and second proportions.

4. The method as claimed in claim 1, wherein the cryogenic liquid is selected from liquefied air, liquefied atmospheric gases, and combinations thereof.

5. A method for the generation of electricity and the storage of energy by means of a thermal power plant or a nuclear power plant, and a liquid vaporization apparatus, wherein the method comprises the steps of:
   A) during a first period:
      a) producing thermal energy by a power plant selected from the group consisting of the thermal power plant and the nuclear power plant, wherein the produced thermal energy is used to vaporize water or to heat water vapor, which is then expanded in a first turbine, and the first turbine is used to drive an electricity generator for the production of electricity;
      b) vaporizing liquefied gas sourced from a cryogenic storage facility to produce a pressurized gas;
      c) heating the pressurized gas to form a heated pressurized fluid; and
      d) expanding the heated pressurized fluid in a second turbine for the production of electricity,
      wherein a proportion of the thermal energy produced in step a) is used for the heating in step c), by employing a proportion of combustion gases from the thermal power plant or a proportion of the water vapor to be delivered to the first turbine of the thermal power plant, or a proportion of the heat of the water vapor to be delivered to the first turbine of the thermal power plant for the heating of the pressurized gas,
      wherein thermal energy is produced by means of a thermal power plant, the combustion gases are produced by the combustion of a fuel, a proportion of the heat of the combustion gases is used to heat the pressurized gas in step c), and a further proportion of the heat of the combustion gases is used to heat the water or water vapor delivered to the first turbine, thereby generating electricity,
   B) during a second period:
      a') producing thermal energy by means of the thermal or nuclear power plant, and using the thermal energy to generate electricity;
      b') using electrical and/or mechanical energy generated by the power plant to produce the cryogenic liquid, and
      c') storing the cryogenic liquid in the cryogenic storage facility.

6. The method as claimed in claim 5, wherein a first proportion of the combustion gases is used to heat the steam delivered to the first turbine for expansion, and a second proportion of the combustion gases heats the pressurized gas, whereby the flow rate of the second proportion of the combustion gases is no more than 30% of the sum of the first and second proportions.

7. The method as claimed in claim 5, wherein the combustion gases firstly heat the pressurized gas, and are then used to heat the steam which is delivered to the first turbine for expansion.

8. A method for the generation of electricity and the storage of energy, the method comprising a first period and a second period,
A) wherein the first period comprises the steps of:
producing thermal energy using a power plant selected from the group consisting of the thermal power plant and the nuclear power plant;
vaporizing a cryogenic liquid sourced from a cryogenic liquid storage facility to form a pressurized gas;
using a first proportion of the thermal energy from the power plant to create steam that is then expanded in a first turbine, wherein the first turbine is used to drive an electricity generator for the production of electricity;
using a second proportion of the thermal energy from the power plant to heat the pressurized gas; and
expanding the pressurized gas in a second turbine for the production of electricity,
B) wherein the second period comprises the steps of:
producing thermal energy by means of the thermal or nuclear power plant, and using the thermal energy to generate electricity;
using electrical and/or mechanical energy generated by the power plant to produce the cryogenic liquid; and
storing the cryogenic liquid in the cryogenic storage facility
wherein the cryogenic liquid is selected from liquefied air, liquefied atmospheric gases, and combinations thereof.

9. The method as claimed in claim 8, wherein the second proportion of the thermal energy constitutes no more than 30% of the thermal energy produced by the power plant.

10. The method as claimed in claim 8, wherein the step of using electrical and/or mechanical energy generated by the power plant to produce the cryogenic liquid further comprises the step of sending electricity to an air liquefaction facility configured to liquefy atmospheric air.

11. A method for the generation of electricity and the storage of energy by means of a thermal power plant or a nuclear power plant, and a liquid vaporization apparatus, wherein the method comprises the steps of:
A) during a first period:
a) producing thermal energy by a power plant selected from the group consisting of the thermal power plant and the nuclear power plant, wherein a first proportion of the produced thermal energy is used to vaporize water or to heat water vapor, which is then expanded in a first turbine, and the first turbine is used to drive an electricity generator for the production of electricity;
b) vaporizing a cryogenic liquid sourced from a cryogenic storage facility to produce a pressurized gas;
c) heating the pressurized gas to form a heated pressurized fluid; and
d) expanding the heated pressurized fluid in a second turbine for the production of electricity,
wherein a second proportion of the thermal energy produced in step a) is used for the heating in step c), by employing a proportion of produced combustion gases from the thermal power plant or a proportion of the water vapor to be delivered to the first turbine of the thermal or nuclear power plant, or a proportion of the heat of the water vapor to be delivered to the first turbine of the thermal or nuclear power plant for the heating of the pressurized gas,
B) during a second period:
a') producing thermal energy by means of the thermal or nuclear power plant, and using the thermal energy to generate electricity;
b') using electrical and/or mechanical energy generated by the power plant to produce the cryogenic liquid; and
c') storing the cryogenic liquid in the cryogenic storage facility,
wherein the cryogenic liquid is selected from liquefied air, liquefied atmospheric gases, and combinations thereof.

12. The method as claimed in claim 11, wherein the first and second turbines in combination produce more electricity than would have been produced by the first turbine alone, using all the produced thermal energy in step a) to heat the water or water vapor to be delivered to the first turbine.

13. The method as claimed in claim 11, wherein the only gas which expands in the second turbine is the heated pressurized fluid.

14. The method as claimed in claim 11, wherein the second period corresponds to a period of lower electricity demand and/or a period in which the electricity tariff is lower than in the first period.

15. The method as claimed in claim 11, wherein, during the second period, the first turbine generates electricity, which is used to produce the cryogenic liquid, and wherein the second turbine is not in service.

16. The method as claimed in claim 11, wherein, during the first period, no cryogenic liquid is produced.

17. The method as claimed in claim 11, wherein, during the second period, the stored cryogenic liquid is not vaporized and/or the heated pressurized fluid is not expanded in the second turbine.

18. The method as claimed in claim 11, wherein step a) produces the thermal energy without combusting the pressurized gas or a stream derived therefrom.

* * * * *